Aug. 7, 1945.   C. C. FARMER   2,381,212
SLACK ADJUSTER
Filed Nov. 16, 1943
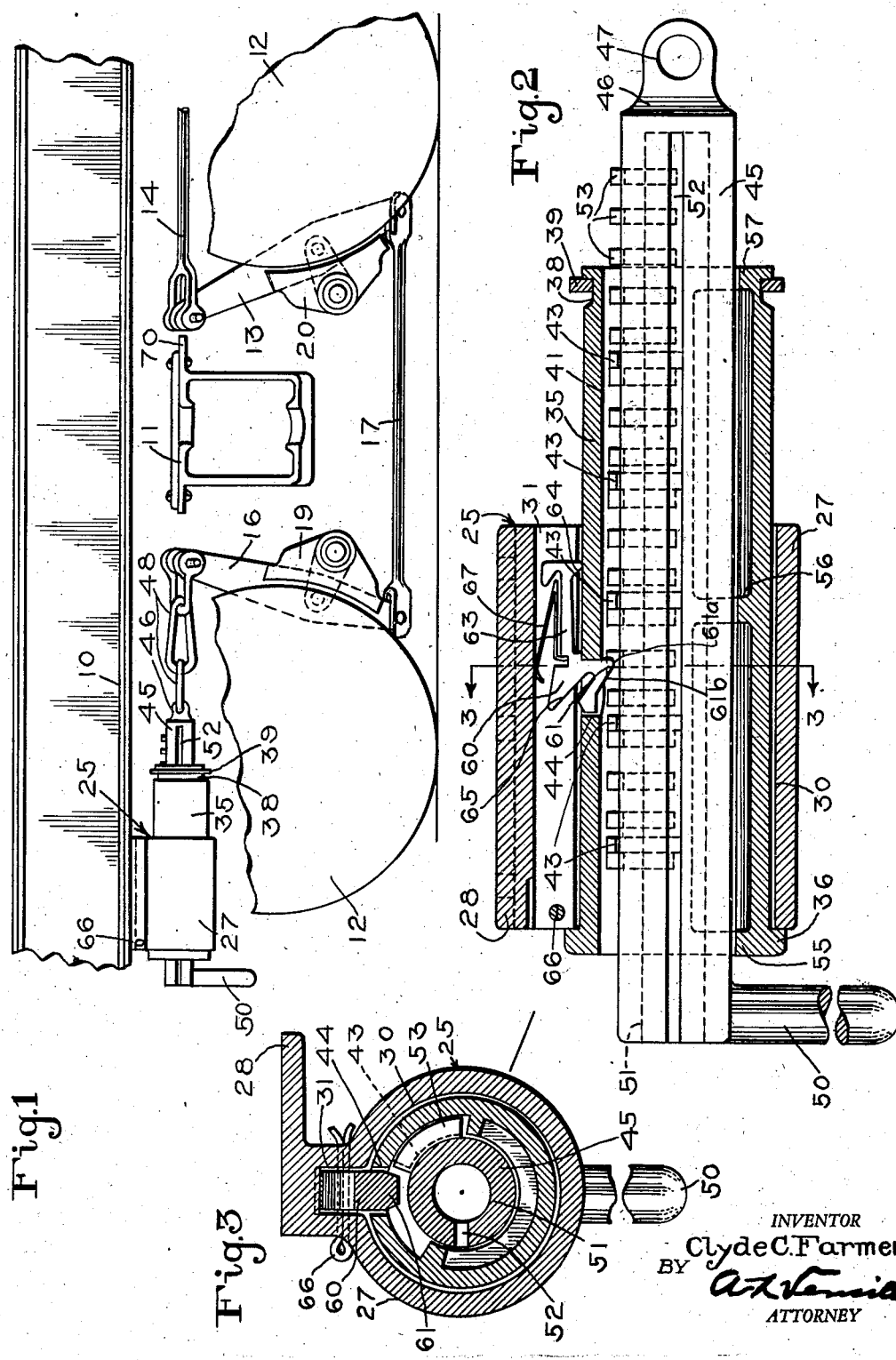
INVENTOR
Clyde C. Farmer
BY
ATTORNEY Patented Aug. 7, 1945

2,381,212

UNITED STATES PATENT OFFICE 2,381,212

SLACK ADJUSTER

Clyde C. Farmer, Pittsburgh, Pa., assignor to The Westinghouse Air Brake Company, Wilmerding, Pa., a corporation of Pennsylvania Application November 16, 1943, Serial No. 510,473

9 Claims. (Cl. 188—197)

This invention relates to slack adjusters for the brake riggings of railroad cars, and particularly to a brake slack adjuster device of the class adapted to be manually actuated for taking up undesired slack in the brake rigging of a car while maintaining a normal brake shoe clearance.

An air brake equipment on a railroad car is maintained in a state of maximum efficiency only when the foundation brake rigging is free from excessive lost motion or slack motion, which tends to develop as a result of wear. Under an ideal condition, the travel of the brake cylinder piston on a freight car should at all times be substantially that for which the brake system was designed, for a piston travel considerably shorter or longer than the standard will effect an undesired change in the rate of development of the desired brake cylinder pressure, and also will tend to have an adverse effect on the maximum pressure of air obtainable in the brake cylinder as a result of a service reduction in brake pipe pressure. It is widely known that such variations from the normal in brake cylinder pressure will have a detrimental influence on the engineer's control of slack action between the cars of a long freight train.

Although well known forms of automatic slack adjusting devices now used in passenger service could be employed on freight cars, for automatically maintaining the proper brake cylinder piston travel, such devices have not as yet demonstrated sufficient economic advantages to warrant the expense of installation of such devices as standard equipment on freight cars. For this reason it has been proposed to provide manually operative slack adjusters suitable for use on freight cars, and constructed and arranged for occasional adjustment to take up undesired slack in the brake riggings.

One object of my invention is to provide an improved manual slack adjuster of the above class having a novel organization of parts designed to facilitate manufacture of the device by mass production methods.

Another object of the invention is to provide an improved manual slack adjuster of simple but rugged construction, which is of foolproof design and readily operable to take up slack movement in the brake rigging without altering the predetermined brake shoe clearance, and which may be economically installed on an existing freight car.

It is a further object of the invention to provide an improved manual slack adjuster comprising a combination of operating elements which may be made by an inexpensive process, and assembled without the requirement of costly machining operations or careful fitting of parts.

Other objects and advantages of the invention will appear in the following more detailed description thereof, taken in connection with the accompanying drawing, in which Fig. 1 is a schematic elevational view of a portion of the brake rigging on a railway car having associated therewith a preferred form of my improved slack adjuster;

Fig. 2 is a vertical sectional view, in enlarged detail of the slack adjuster shown in Fig. 1; and Fig. 3 is a sectional view taken substantially along the line 3—3 of Fig. 2.

The elements of a railway car shown diagrammatically in Fig. 1 comprise a car underframe center sill 10, a truck bolster 11 for supporting the center sill in the usual manner, the truck wheels 12, and a suitable brake assemblage including a live lever 13 operatively connected at its upper end to a pull rod 14, a dead lever 16 pivotally connected to the live lever 13 through the medium of a bottom rod 17, and brake shoe elements 19 and 20 supported on suitable hangers (not shown) for engagement with the respective wheels. The brake shoe elements 19 and 20 are operatively connected to the levers 16 and 13, respectively, by means of transversely disposed brake beams of the type commonly employed in such equipments. According to the invention, the upper end of the dead lever 16 is anchored to the center sill 10 through the medium of my improved manually operable slack adjuster, which is designated generally in Fig. 1 by the reference numeral 25.

As is best shown in Fig. 2 of the drawing, the slack adjuster 25 comprises a body or housing 27, which has formed thereon a flange 28 having suitable apertures for receiving bolts by means of which the housing may be secured to the center sill 10, shown in Fig. 1. The housing 27 is preferably a malleable iron casting of cylindrical form, the interior round opening 30 of which may be roughly finished by a broaching operation. Formed in the upper portion of the housing adjacent the flange 28 is a longitudinal groove or channel 31, which is open to the round opening 30. Slidably mounted in the housing 27 and extending coaxially through the opening 30 therein is a clearance gauging element or sleeve member 35, which is preferably made of malleable cast iron and may be trued by a die press operation for insuring adequate clearance and fit within the broached housing 27 that will prevent binding between these parts. It will be observed that the sleeve member 35 is considerably longer than the housing 27, so that a portion of the sleeve member normally projects outwardly of the opening 30 when the sleeve member is in a normal position, as shown in Fig. 2. With the sleeve member in this position, a collar 36 formed on one end thereof engages the end of the housing 27. Formed on the opposite end of the sleeve member 35 is an annular groove 38, which is adapted to receive a snap ring 39 having an outside diameter larger than that of the opening 30 in the housing 27, so that upon movement of the sleeve member 35 to the left, as shown in the drawing, the snap ring 39 will be brought into abutting relation with the housing. As will hereinafter be explained, the proportionate length of the sleeve 35 with respect to that of the housing is predetermined in accordance with the amount of brake shoe clearance required for the associated truck brake rigging for the freight car on which the slack adjuster is mounted.

The sleeve member 35 is a relatively thin-walled member and has formed therein a longitudinally disposed cavity 41, on the rounded wall of which are formed a plurality of inwardly projecting arcuate lugs or stud portions 43. These lugs, which are relatively short and occupy less than 90° of the interior surface of the cavity 41, are arranged at right angles with respect to the axis of the sleeve member 35, and are spaced apart in longitudinal alignment, as is best shown in Fig. 2. Also formed in the sleeve member 35 is a lateral opening or slot 44, which is adapted to be positioned in registration with the interior channel 31 of the housing 27, when the parts are assembled as shown in the drawing.

The slack adjuster 25 further comprises an operating rod or handle member 45, which is adapted to be operatively mounted within the cavity 41 of the sleeve member 35, and which carries a connecting portion 46 on one end thereof having a suitable aperture 47 for receiving one of a plurality of links 48, shown in Fig. 1, by means of which the rod is connected to the upper end of the dead lever 16. A handle portion 50 is formed on the outer end of the operating rod 45 opposite the end connected to the brake rigging. The operating rod may be a malleable iron casting, or preferably a steel casting, and has a longitudinal central cavity 51 and a lateral slit 52 designed to reduce the weight of the member without impairing its tensile strength. This construction further contributes to the economical casting of the operating rod 45 in that it provides a substantial core anchor and facilitates sizing of the element by a simple press die operation.

Formed laterally on the central or shank portion of the operating rod 45 are a number of projecting arcuate ears or lug portions, several of which are indicated by the reference numeral 53, which lug portions are aligned in spaced parallel relation and are constructed and arranged for interlocking engagement with the arcuate stud portions 43 carried within the sleeve casting 35. In the form of the device illustrated, however, the row of lug portions 53 is disposed on the upper surface of the operating rod 45 and in a position to render these lug portions free from contact with the stud portions 43 of the sleeve member 35 while the operating rod is maintained in its normal position by the weight of the handle 50. It will be noted that although but a few stud portions 43 are provided on the sleeve member 35, a relatively large number of lug portions 53 are carried by the operating rod 45, which is longer than the sleeve member. It will thus be understood that the operating rod 45 is constructed and arranged to be shifted to any one of a number of positions with respect to the sleeve member 35 and locked in place by engagement of the lug portions 53 with corresponding stud portions 43.

For supporting the operating rod 45 substantially concentrically within the sleeve member 35 without causing binding frictional engagement between the two elements, three spaced arcuate rib portions 55, 56 and 57 are formed on the lower half of the sleeve casting 35, as shown in Fig. 2. This view indicates clearance space between the sleeve member and the operating rod, but it will be understood that in practice the latter member is adapted to rest on the rib portions just mentioned.

With my improved manual slack adjuster 25 assembled and installed as just described, the device is adapted to enable an operator to take up slack motion in the associated brake rigging by first pulling the handle 50 to measure normal brake shoe clearance, as determined by movement of the stop ring 39 carried by the sleeve member 35 into engagement with the adjacent or right hand end of housing 27, and by then turning the handle to disengage the lugs 53 and 43 of the operating rod 45 and sleeve member, respectively, after which further pulling of the handle will remove the slack from the rigging assemblage. With the undesired slack thus taken up, the operator can return the handle 50 to its normal depending position, thereby again interlocking the operating rod 45 with the sleeve member 35. Upon subsequent release of the handle, the elements of the brake rigging assume their normal positions, drawing the operating rod and sleeve member inwardly, or to the right in the drawing, until the shoulder 36 of the sleeve member again engages the outer left hand end of the housing 27, such free movement being proportional to the necessary brake shoe clearance, as already explained. As another feature of my invention, means is provided for insuring correct cooperative alignment of the operating rod 45, sleeve member 35, and housing 27, comprising a latch member 60, which is adapted to be fitted into the channel 31 of the housing and which has a pawl portion 61 that projects downwardly through the slot 44 and into cavity 41 of the sleeve member 35. The latch member 60 is of a simple, one piece design, and may be readily cast in malleable iron in its finished form, so that expensive machining of the element is not required. In addition to the pawl portion 61, the latch member comprises a shank 63 which extends longitudinally within the channel 31 and terminates in a tail portion 64 engageable with the upper surface of the sleeve member 35 for providing a fulcrum about which the pawl portion can be raised and lowered. The pawl portion 61 of the latch member is adapted to project into the cavity 41 of the sleeve member and into cooperative alignment with the lugs 53 carried by the operating rod 45, although these lugs are normally maintained at one side of and out of engagement with the latch member, as may be seen in Fig. 3.

It will thus be understood that so long as the latch member 60 is disposed in its normal position as shown in Fig. 2, an operator will be unable to actuate the operating rod 45 independently of the sleeve casting 35, for if the operator tries to turn the operating rod without first pulling it through the predetermined travel required to maintain brake shoe clearance as already explained, he will either cause one of the lugs 53 on the rod to strike the pawl portion 61 of the latch member, thus preventing further rotation of the rod, or in case the pawl portion falls between two of the lugs 53, the operator will nevertheless be unable to pull the operating rod without also moving the sleeve member 35, since one of the lugs 53 will then be brought into locking engagement with the pawl portion 61.

With one of the lugs 53 of the operating rod 45 held in engagement with the vertical surface 61a of the pawl portion 61, movement of the operating rod to the left, as viewed in Fig. 2, will of course cause movement in the same direction of the sleeve member 35 until the stop ring 39 is brought nearly into engagement with the adjacent surface of the housing 27. In the course of such an operation, however, the latch member 60 is adapted to be lifted out of the path of the lugs 53 as the sleeve member 35 approaches the limit of its predetermined travel, as a result of engagement in a canted slot 65 formed in the latch member 60 by a transversely disposed cotter pin 66, which is mounted in the housing 27 athwart the left-hand end of the channel 31. It will thus be seen that upon completion of the travel of the sleeve member 35 to establish the necessary brake shoe clearance, further movement of the operating rod 45 to the left may then be made to take up slack in the brake rigging, as already explained.

The weight of the latch member 60 may be relied upon to urge it toward the normal position in which it is shown in Fig. 2, or if preferred, a leaf spring 67 may be interposed between its upper surface and the wall of the channel 31 for biasing the member downwardly. The spring 67 may be suitably formed to provide a freely slidable fit with the channel surface. The latch member 60 is also provided with an inclined surface 61b which is adapted to ride over the lugs 53 in case it is desired to restore the elements of the slack adjuster to the release position, to enable replacement of worn brake shoes, or other repairs. Under normal conditions, however, after a slack take-up operation has been accomplished, the operator should rotate the operating rod 45 back to its normal position with the handle 50 disposed vertically, in order to interlock the lugs 53 with the stud portions 43 of the sleeve members, after which the handle 50 may be released in the usual manner.

Referring to Fig. 1 of the drawing, when the manual slack adjuster 25 is operated in the manner above explained to take up slack in the rigging, both sets of brake shoe elements 19 and 20 will, of course, be brought into engagement with the associated wheels of the truck. At the same time the live lever 13 will be tilted so that the upper end thereof connected to the rod 14 will be carried to the left as viewed in the drawing. In order to prevent undesired alteration of the positioning of the other elements of the brake rigging at the opposite end of the car, not shown in the drawing, a stop element 70 may be provided on the truck bolster 11 in operative alignment with the upper end of the lever 13, for limiting the slack take-up movement. It will thus be understood that two manual slack adjusters 25 are required for each freight car, to permit the desired adjustment of the brake rigging at each end of the car.

From the foregoing description of a preferred embodiment of my invention, it will be seen that a manually operative slack adjuster of my improved design may readily be installed on a freight car, and is adapted to enable the piston travel of the brake cylinder on the car to be quickly and accurately adjusted well within the tolerances from the exact standard fixed by agreement or governmental decree. Although the operating elements of my improved slack adjuster device are of sturdy, simple construction, and may be inexpensively formed and assembled for operation to provide a solid anchor for a standard truck rigging on a freight car, the various operating parts have been carefully designed to enable an inexperienced operator to manipulate the device in the proper manner and without the benefit of special instructions. The slack adjuster device is thus well adapted for use on cars employed in interchange service.

Having now described my invention, what I claim as new and desire to secure by Letters Patent is:

1. In a brake rigging slack adjuster of the class described, in combination, a stationary casing, a clearance gauging member movably mounted in said casing and having means for limiting travel thereof within said casing, and an operating member mounted in normally interlocking engagement with said gauging member and having means to enable manual rotation for disengaging said operating member from said gauging member said operating member being constructed and arranged to be manually actuated in cooperation with said gauging member for taking up slack in excess of a predetermined clearance movement in the associated brake rigging, said operating member and gauging member being equipped with means preventing independent operation of either prior to operation through said predetermined clearance movement.

2. In a brake rigging slack adjuster of the class described, in combination, a stationary casing, a clearance gauging member movably mounted in said casing and having means for limiting travel thereof within said casing, and an operating member mounted in normally interlocking engagement with said gauging member and having means to enable manual rotation for disengaging said operating member from said gauging member, said operating member being constructed and arranged to be manually actuated first in cooperation with said gauging member and then released therefrom to permit taking up of slack movement in the associated brake rigging, said operating member and gauging member being equipped with means preventing independent operation of either prior to operation through said predetermined clearance movement.

3. In a brake rigging slack adjuster of the class described, in combination, a stationary casing, a clearance gauging member movably mounted in said casing and having means for limiting travel thereof within said casing, and an operating member mounted in normally interlocking engagement iwth said gauging member, said operating member being constructed and arranged to be manually pulled first to the limit of travel of said gauging member, then rotated out of interlocking engagement therewith and pulled to a new position relative to said gauging member to effect taking up of slack in the brake rigging.

4. In a brake rigging slack adjuster of the class described, in combination, a casing having a longitudinal opening, a hollow clearance gauging member slidably mounted in said opening and having stationary stud portions formed on said member and projecting interiorly thereof, means for limiting travel of said gauging member relative to said casing, and an operating rod movably mounted in said gauging member and having a plurality of lugs adapted for interlocking engagement with said stud portions, said operating rod being constructed and arranged for manual operation first through the limited traverse permitted said gauging member, next for turning to release said studs and lugs, and finally to take up slack in the associated brake rigging.

5. In a brake rigging slack adjuster of the class described, in combination, a casing having a longitudinal opening, a hollow clearance gauging member slidably mounted in said opening and having stud portions projecting interiorly thereof, means limiting movement of said gauging member in either direction relative to said casing, a handle member operatively mounted in said gauging member and having a plurality of lugs normally disposed in locking engagement with said stud portions, said handle member being constructed and arranged to be first pulled to the limit of travel of said gauging member, then turned to disengage said lugs and stud portions and finally pulled to a new relative position in said gauging member for taking up slack in the brake rigging.

6. In a brake rigging slack adjuster of the class described, in combination, a casing having a longitudinal opening, a hollow clearance gauging member slidably mounted in said opening and having stationary stud portions formed on said member and projecting interiorly thereof, means limiting movement of said gauging member in either direction relative to said casing, a handle member adjustably mounted in said gauging member and having a plurality of lugs adapted for interlocking engagement with said stud portions, said handle member being constructed and arranged for manual operation to take up slack, and means for preventing premature adjustment of said handle member relative to said gauging member prior to normal movement of the latter.

7. In a brake rigging slack adjuster device of the class described, the combination of a stationary casing having a longitudinal bore and interior channel thereto, a substantially cylindrical gauging member slidably mounted in said bore and carrying means for limiting its movement in either direction within said casing, said gauging member having an opening adapted to register with said channel, a plurality of interiorly projecting stud portions formed on said gauging member, a manually operative slack take-up rod adjustably mounted within said gauging member and having a plurality of lugs adapted to be turned into and out of interlocking engagement with said stud portions, and a latch element loosely mounted in the channel in said casing and extending through said opening in the gauging member, for locking said manually operative rod against movement independently of said gauging member prior to preliminary movement of the latter element.

8. In a brake rigging slack adjuster device of the class described, the combination of a stationary casing having a longitudinal bore and interior channel open thereto, a substantially cylindrical gauging member slidably mounted in said bore and carrying means for limiting its movement in either direction within said casing, said gauging member having an opening adapted to register with said channel, a plurality of interiorly projecting stud portions formed on said gauging member, a manually operative slack take-up rod adjustably mounted within said gauging member and having a plurality of lugs adapted to be turned into and out of interlocking engagement with said stud portions, a freely movable latch element operatively mounted in said channel in the casing and having a portion extending through said opening in the gauging member into operative alignment with said lugs on the slack take-up rod, and means for moving said latch element out of the normal position following preliminary movement of said gauging member during operation of the device to take up slack in the brake rigging.

9. In a brake rigging slack adjuster of the class described, in combination, a bracket body having a longitudinal opening, a hollow clearance gauging member slidably mounted within said opening and having a limited traverse within said body, said member having lugs formed interiorly thereon, an operating member movably mounted in said gauging member, said operating member having lugs formed thereon for engagement with said first mentioned lugs, a movable element normally urged into a position for interlocking said gauging and operating members to prevent relative rotation of said operating member, and means carried by said body and operatively aligned with said movable element for disengaging same from said operating member upon completion of the limited traverse of said gauging member through said body, whereby said operating member is rendered rotatable to disengage said lugs and freely movable relative to said gauging member for permitting take-up of slack in the brake rigging.

CLYDE C. FARMER.